(12) United States Patent
Abou-Eid et al.

(10) Patent No.: US 10,759,253 B2
(45) Date of Patent: Sep. 1, 2020

(54) AIR HANDLING SYSTEM FOR A LAND TRANSPORT VEHICLE, VEHICLE COMPRISING SUCH A SYSTEM AND AIR HANDLING METHOD

(71) Applicant: Alstom Transport Technologies, Saint-Ouen (FR)

(72) Inventors: Rami Abou-Eid, Paris (FR); Philippe Chevalier, Rueil Malmaison (FR); Alexandre Heuze, Saint Ouen (FR)

(73) Assignee: Alstom Transport Technologies, Saint-Ouen (FR)

( * ) Notice: Subject to any disclaimer, the term of this patent is extended or adjusted under 35 U.S.C. 154(b) by 0 days.

(21) Appl. No.: 15/692,899

(22) Filed: Aug. 31, 2017

(65) Prior Publication Data
US 2018/0057023 A1    Mar. 1, 2018

(30) Foreign Application Priority Data
Sep. 1, 2016 (FR) ...................... 16 58131

(51) Int. Cl.
*B60H 1/00* (2006.01)
*B61D 27/00* (2006.01)
*F25B 25/00* (2006.01)

(52) U.S. Cl.
CPC ......... *B60H 1/005* (2013.01); *B61D 27/0018* (2013.01); *B61D 27/0072* (2013.01);
(Continued)

(58) Field of Classification Search
CPC . B60H 1/005; B60H 1/00764; B60H 1/00771
See application file for complete search history.

(56) References Cited

U.S. PATENT DOCUMENTS

| 6,330,909 | B1 * | 12/2001 | Takahashi | .............. B60H 1/005 165/202 |
| 8,522,691 | B1 * | 9/2013 | Foege | ...................... F01P 11/14 105/26.05 |
| 2005/0109882 | A1 * | 5/2005 | Armbruster | ............. B61L 3/006 246/167 R |

FOREIGN PATENT DOCUMENTS

| BE | 1001214 | 8/1989 |
| EP | 2894419 A1 | 7/2015 |

(Continued)

OTHER PUBLICATIONS

Search Report dated Jun. 23, 2017 during the prosecution of FR 1658131.

*Primary Examiner* — Eric S Ruppert
(74) *Attorney, Agent, or Firm* — Troutman Pepper Hamilton Sanders LLP

(57) ABSTRACT

An air handling system (1) for a land transport vehicle, in particular a railway vehicle (M) is disclosed. The system includes: one or more air handling units (2) distributed within the vehicle (M); a cooling machine (4) that supplies frigories to the air handling units; and a frigories storage unit (8) that is capable of being loaded by the cooling machine and of supplying frigories to the air handling units when the vehicle is travelling in an enclosed or partially enclosed space. When the vehicle (M) is travelling in the open air, the cooling machine (4) supplies frigories to the air handling units (2) and loads the frigories storage unit (8) if a surplus of frigories is produced, by discharging into the exterior of the vehicle (M) the heat extracted from an interior volume of the vehicle.

7 Claims, 3 Drawing Sheets

(52) U.S. Cl.
CPC ........ *F25B 25/005* (2013.01); *B60H 1/00764* (2013.01); *B60H 1/00771* (2013.01); *Y02T 30/42* (2013.01)

(56) References Cited

FOREIGN PATENT DOCUMENTS

| | | | |
|---|---|---|---|
| FR | 2629414 A1 | | 10/1989 |
| FR | 2859691 | | 3/2005 |
| JP | H07009995 | * | 1/1995 |
| JP | 2006021571 | * | 7/2004 |

* cited by examiner

AIR HANDLING SYSTEM FOR A LAND TRANSPORT VEHICLE, VEHICLE COMPRISING SUCH A SYSTEM AND AIR HANDLING METHOD

CROSS-REFERENCE TO RELATED APPLICATION

This application is based upon and claims the benefit of priority of the prior French Patent Application No. 16 58131, filed on Sep. 1, 2016, the entire contents of which are incorporated herein by reference.

FIELD OF THE INVENTION

The invention relates to an air handling system for a land transport vehicle, in particular a railway vehicle, as well as a land transport vehicle comprising such a system. The invention also relates to an air handling method for a land transport vehicle.

BACKGROUND

In railway vehicles, it is a known practice to install air handling systems, in particular air conditioning, including air handling units in each passenger compartment and a cooling machine for producing frigories, that is to say, negative heat energy which is capable of cooling an environment by extracting the heat from the interior of the vehicle, and discharging it into the exterior of the vehicle.

During the passage of vehicles through enclosed areas, such as tunnels, the discharging of heat into the exterior of the vehicle causes a heating of the air in the tunnels, which brings about a steady increase in the temperature in the tunnels.

In order to solve this problem, it is a known practice, in particular from the documents WO-2005/014365 and WO-2005/025959, to equip railway vehicles with storage units for storing frigories, for example in the form of ice or liquid maintained at a predetermined temperature in order to supply the cold source necessary for the air conditioning of the vehicle during its passing through a tunnel without operationally implementing the cooling machine and thus discharging the heat into the tunnel.

In the document WO-A-2005/014365, the frigories storage unit needs to be refilled regularly in particular with ice, while in the document WO-A-2005/025 959, the material that is used for storing frigories is ice produced during the time the vehicle is travelling in the open air with the help of a specific production unit by using in particular chemical products such as glycol.

Such technical solutions have the disadvantage of involving cumbersome frigories storage units that are not practical, and require regular refilling with specific products, that are used to produce the cold for cooling when passing through tunnels.

SUMMARY

It is these drawbacks in particular that the invention is intended to remedy by providing a novel air handling system for a land transport vehicle, in particular a railway vehicle, in which the cold required during the passing through tunnels is obtained in a way that is more economical and efficient in comparison with the techniques of the prior art.

To this end, the invention relates to an air handling system for a land transport vehicle, in particular a railway vehicle, comprising:
one or more air handling units distributed within the vehicle;
a cooling machine that supplies frigories to the air handling units;
a frigories storage unit that is capable of being loaded by the cooling machine and of supplying frigories to the air handling units when the vehicle is travelling in an enclosed or partially enclosed space.

This system is characterized in that when the vehicle is travelling in the open air, the cooling machine supplies frigories to the air handling units and loads the frigories storage unit if a surplus of frigories is produced, by discharging into the exterior of the vehicle the heat extracted from an interior volume of the vehicle.

Thanks to the invention, the cold used during the passage through enclosed spaces does not require specific materials and entails the operation of only the components that are already present in the vehicle, by virtue of the use of the cooling machine which is provided for the travel in the open air and whereof the excess production of frigories is used to refill or load the frigories storage unit.

According to aspects of the invention that are advantageous but not mandatory, such a system may incorporate one or more of the following characteristic features, taken into consideration in accordance with any technically feasible combination:
The air handling system comprises a control device that is capable of determining whether the vehicle is travelling in an enclosed/partially enclosed space or in the open air.
The air handling system comprises a control device that is capable of triggering the production of frigories by the cooling machine if the cold storage unit has a zero load.
The air handling system comprises a control device that is capable of measuring the temperature on the exterior of the vehicle, the temperature of the air present within the interior of the vehicle in the spaces reserved for persons, and of determining the quantity of frigories to be delivered by the cooling machine or the frigories storage unit.
The capacity of the frigories storage unit is dimensioned in a manner such that the frigories storage unit is able to be fully loaded by the cooling machine when the vehicle is travelling in the open air or is found to be in a refilling/reloading site/location and the frigories storage unit is able to supply frigories for the entire time period that the vehicle is travelling in an enclosed/partially enclosed space.

The invention also relates to a land transport vehicle, in particular a railway vehicle, comprising an air handling system as mentioned here above.

The invention also relates to an air handling method for a land transport vehicle, equipped with an air handling system including:
one or more air handling units;
a cooling machine that supplies frigories to the air handling units;
a frigories storage unit that is capable of being loaded by the cooling machine and of supplying frigories to the air handling units when the vehicle is travelling in an enclosed or partially enclosed space.

This method is characterized in that it includes a step that consists of enabling the cooling machine to supply frigories to the air handling units, and if a surplus of frigories is produced, of loading the frigories storage unit by means of the cooling machine when the vehicle is travelling in the open air, by discharging into the exterior of the vehicle heat extracted from an interior volume of the vehicle.

According to one aspect of the invention that is advantageous but not mandatory, the method includes steps consisting of the following:
a) measuring the external temperature and the temperature of the air extracted from the interior of the vehicle;
b) calculating a set point temperature and a corresponding cooling load;
c) determining whether the vehicle is in an enclosed or partially enclosed space;
d) if the vehicle is in the open, supplying the cooling load determined in the step b) from the cooling machine and storing the excess in the frigories storage unit;
e) if the vehicle is in an enclosed or partially enclosed area, measuring the state of load of the frigories storage unit;
f) if the state of load of the frigories storage unit is of the order of zero, supplying the cooling load from the frigories machine;
g) if the state of load of the frigories storage unit is greater than zero, supplying the cooling load from the frigories storage unit.

DETAILED DESCRIPTION

The invention will be better understood and other advantages thereof will become more clearly apparent in the light of the description that follows of an air handling system in accordance with the principle thereof, and with reference being made to the accompanying drawings in which.

Figure 1:
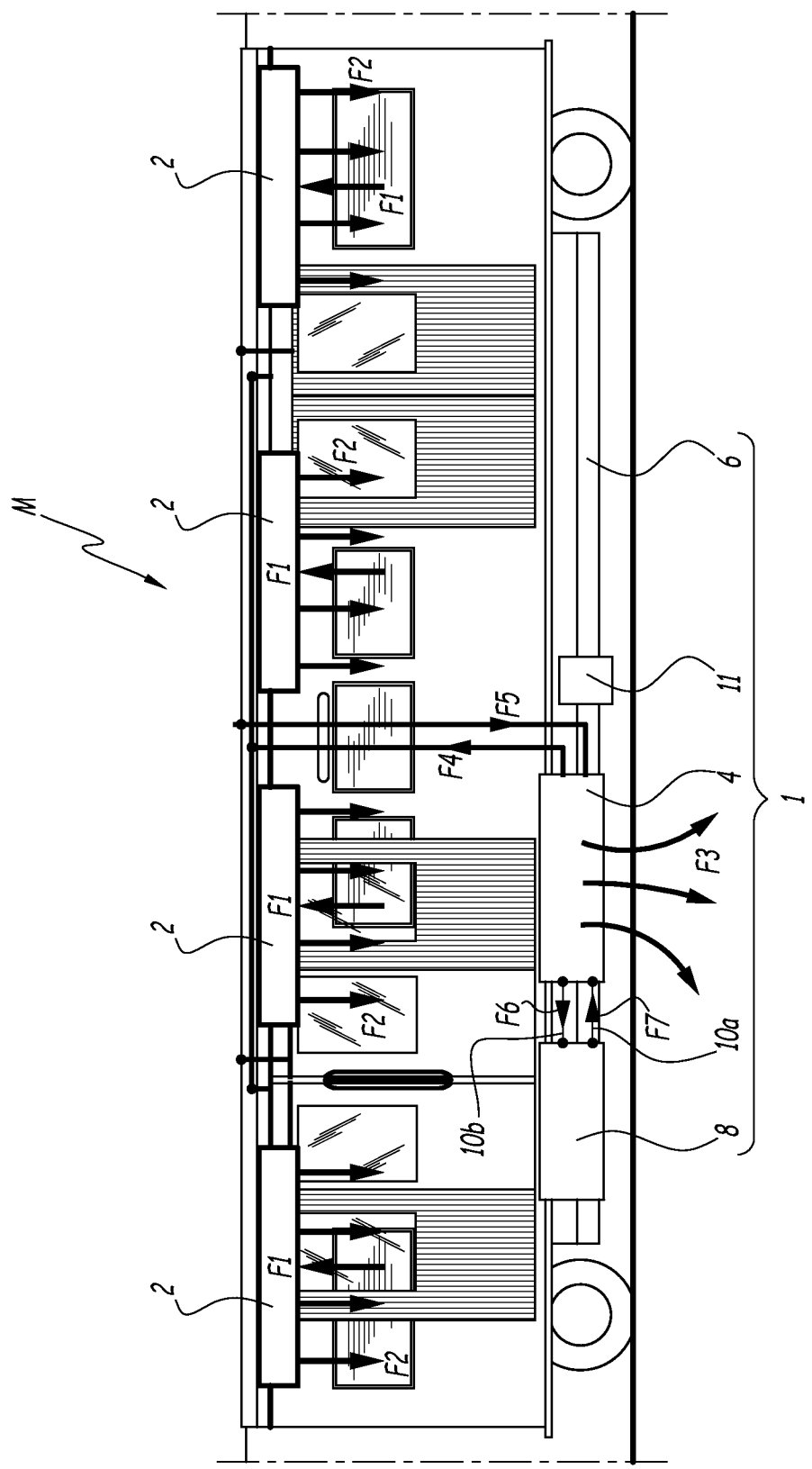
FIG. 1 is a view of a railway vehicle in accordance with the invention, incorporating an air handling system according to the invention, in a first configuration.
Figure 2:
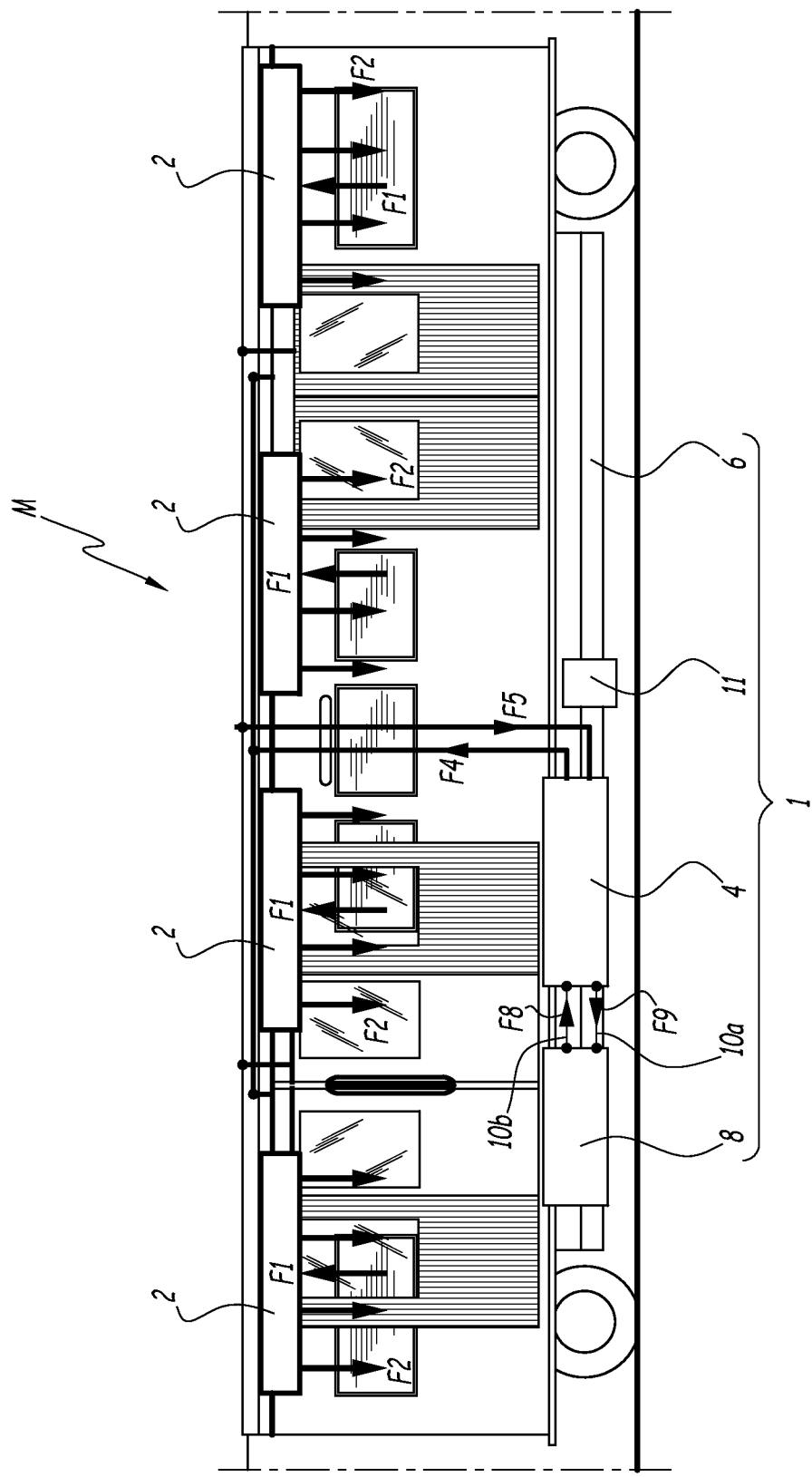
FIG. 2 is a view similar to the one in FIG. 1, for a second configuration.

FIGS. 1 and 2 show a part of a railway vehicle M, in this case a metro/subway. By way of a variant, the railway vehicle may also be a train, tram or any other type of rolling vehicle running on a railway and the invention is also applicable to any other type of land transport vehicle running on land, on a road, such as a bus, a truck, a car, a mining vehicle, etc., and that can alternately be travelling in the open and in enclosed or partially enclosed spaces.

The part of the vehicle M represented in FIGS. 1 and 2 is more specifically a car that is part of a metro train. This car is capable of accommodating passengers and the vehicle M comprises for this purpose an air handling system 1 that includes air handling units 2 distributed in the metro M, including several in the car represented in this example.

Each of these air handling units 2 comprises a heat exchanger and ventilation means that are not represented, which provide the ability to extract a stream of ambient air F1 from the interior of the metro M, and to infuse a new stream of air F2 that has been treated and potentially cooled by its passage through the heat exchanger of each unit 2. The air handling system 1 comprises a cooling machine 4, which is installed, in this example, in a bottom part 6 of the metro M. The cooling machine 4 is capable of circulating, in the heat exchangers of the air handling units 2, a refrigerant fluid that is cooled in a manner so as to ensure that a predefined temperature is maintained in the interior space of the metro M.

In operation, the cooling machine 4 absorbs the heat from the air stream F1 extracted from the interior volume of the metro 6 and discharges it to the exterior of the vehicle M, according to the conventional principle of air conditioning. This operation does not exhibit disadvantages when the railway vehicle M runs in a space in the open air, as is the case in FIG. 1. The cooling machine 4 discharges in this case a hot air stream F3 to the exterior.

In contrast, when the vehicle M travels in an enclosed or semi-enclosed space, such as a tunnel or an underground metro station, the heat discharged to the exterior of the vehicle M increases significantly and in a cumulative manner, the temperature of the enclosed or semi-enclosed space wherein the vehicle M travels.

The air handling system 1 thus comprises a frigories storage unit 8. The unit 8 is also in this example, installed in the bottom part 6 and is capable of being refilled or reloaded with frigories by means of the cooling machine 4. The frigories storage unit 8 and the cooling machine 4 are for this purpose connected by a circuit for refrigerant fluid comprising two pipes 10a and 10b. The pipes 10a and 10b make possible the conveying of refrigerant fluid to the storage unit 8 for storing frigories, while the heated refrigerant fluid is returned to the cooling machine 4.

The cooling machine 4 is capable of supplying the refrigerant fluid to the air handling units 2 independently of the frigories storage unit 8. Thus, even if the frigories storage unit 8 has a zero load rate, the cooling machine 4 is capable of directly supplying a sufficient quantity of heat transfer fluid to the air handling units 2. This type of operation, shown in FIG. 1, takes place when the vehicle M travels in the open air. The supply of the cooled refrigerant fluid is represented by the arrow F4, while the return of the heated refrigerant fluid after release of its frigories in the fresh air F2 is represented by an arrow F5.

Upon the needs of the air handling units 2 being covered by the cooling capacity of the cooling machine 4, the surplus frigories produced by the cooling machine 4 is stored in the frigories storage unit 8. The cooled refrigerant fluid is directed along the arrow F6 in the pipe 10b to the unit 8, and exits therefrom after releasing its frigories along the arrow F7 in the pipe 10a.

The frigories storage unit 8 may make use of any type of frigories storage means such as, for example, distilled water, mineral water, normal water from the main water system, phase change materials. This storage means will recover the frigories from refrigerant fluids such as refrigeration/cooling gas (R134A, R407C, 1234yf, R22, R410, R744, R513, etc.), the heat transfer fluids or secondary refrigerant fluids (such as glycol water, which is normal water from the main water system to which was added a certain percentage of glycol. Strictly speaking, the glycols are diols in which two hydroxyl groups are borne by different carbon atoms, usually but not necessarily vicinal. Glycol is also a synonym for the simplest of these glycols, ethylene glycol (or ethane-1, 2-diol, $HOCH_2—CH_2OH$) which is a vicinal diol. This is the most important industrial diol that is widely used as antifreeze fluid. Propylene glycol also has a number of industrial uses (pharmaceutical, agro-pharmaceutical, aerospace, etc) and is less toxic. This list is not exhaustive and may also include a fluid like temper fluid that is acetate and potassium formate based. Other types of secondary refrigerant fluids may be used such as Friogel, temper, etc.

When the vehicle M passes through an area wherein the average temperature will change under the effect of heat released by a cooling machine, that is to say an enclosed or partially enclosed area such as a tunnel, the frigories stored in the storage unit 8 is supplied to the air handling units 2, while the heat exchanges operated by the cooling machine 4 are stopped. Such a configuration is represented in FIG. 2. The frigories is directed to the air handling units 2 via the cooling machine 4 without undergoing thermal exchanges therein. The circulation of the refrigerant fluid in the pipes 10*a* and 10*b* is reversed, the frigories being transferred along the arrow F8 in the pipe 10*b*, and the heated refrigerant fluid redirected to the unit 8 along the arrow F9 via the pipe 10*a*. The interior of the vehicle M is thus cooled without the heat being discharged into the exterior of the vehicle M and does not warm up the ambient temperature of the tunnel.

According to one variant that is not represented, when the frigories storage unit 8 supplies the air handling units 2, a refrigerant fluid circuit that is completely decoupled from the cooling machine 4 and connected directly to the air handling units 2 may be implemented.

The system 1 comprises a control device 11 that is capable of determining whether the vehicle M is travelling in an enclosed space or in the open air, for example by means of pressure sensing, by camera, GPS positioning, etc.

The control device 11 is also capable of initiating the production of frigories by the cooling machine 4 if the frigories storage unit 8 has a zero load.

The control device 11 is capable of measuring the temperature on the exterior of the vehicle M, as well as the temperature of the ambient air present within the interior of the vehicle M, and of determining the quantity of frigories to be delivered by the cooling machine 4 or the frigories storage unit 8 in order to obtain a comfort temperature within the interior of the vehicle M.

The capacity of the frigories storage unit 8 is dimensioned in a manner such that the frigories storage unit 8 can be fully reloaded by the cooling machine 4 when the vehicle M travels in the open air or in a zone referred to as the refill/reload zone (station, depot, etc.), and the frigories storage unit 8 is able to supply frigories throughout the entire time period of travel of the railway vehicle M in an enclosed or partially enclosed space.

Figure 3:
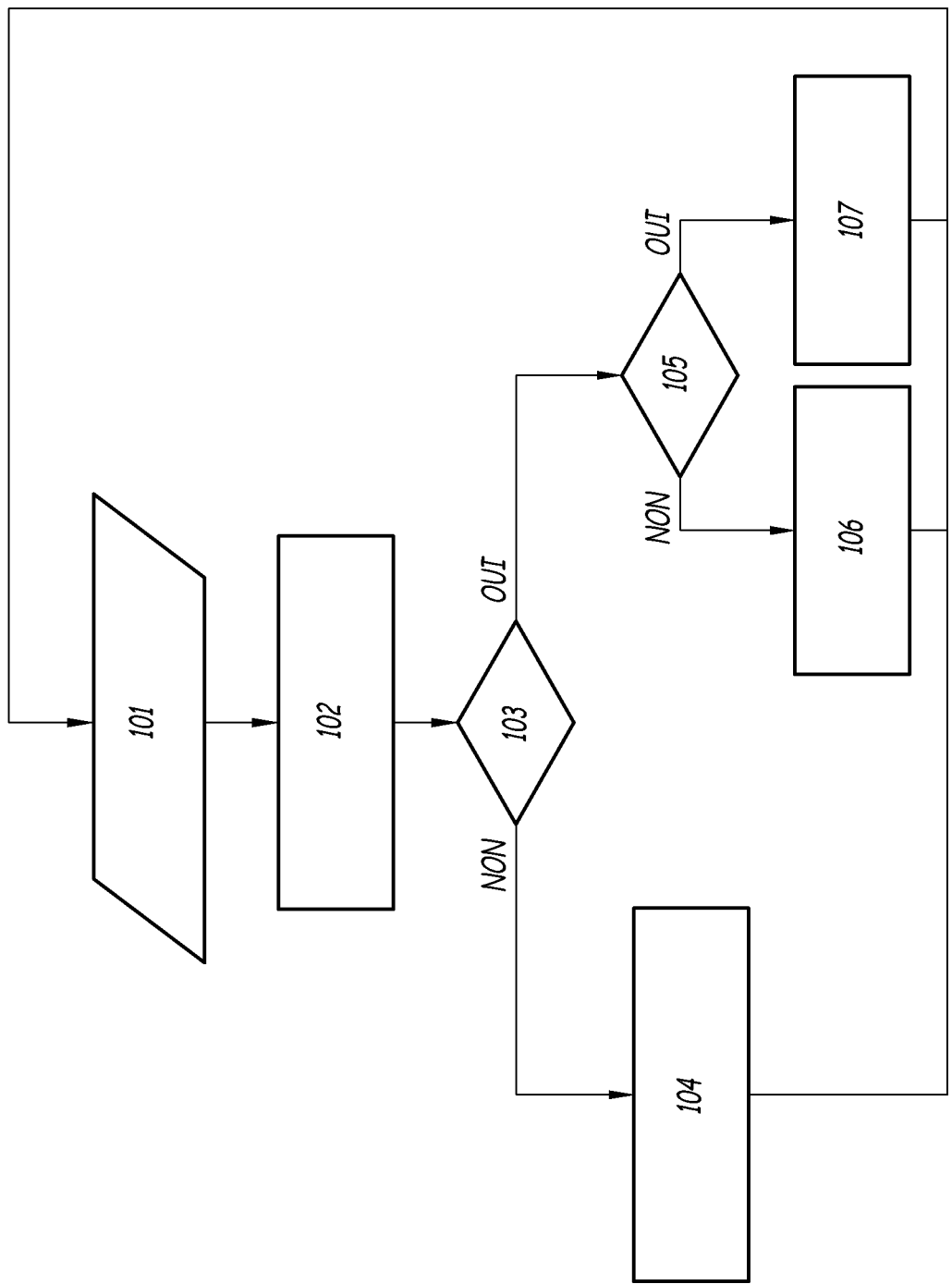
FIG. 3 is a logic diagram of a control method for controlling the air handling system according to the invention.

The system 1 is operationally implemented in the context of a control method that functions by way of iterations of calculation, the operation whereof is described here below in connection with FIG. 3.

At each iteration, the external temperature, that is to say the temperature on the exterior of the vehicle, and the temperature of the air extracted from the interior of the vehicle M are measured in a step 101. In a second step 102, a set point temperature is calculated on the basis of the external and internal temperatures measured in the step 101. The temperature of the air extracted from the interior of the vehicle M is compared with the set point temperature, and this comparison is used to determine a cooling load that indicates the amount of frigories to be supplied in order to obtain the set point temperature in the internal space of the vehicle M. In a third step 103, the algorithm determines, by using any one of the means described here above, whether the vehicle M is in a tunnel. If the vehicle M is not in a tunnel, the cooling load is supported, in a step 104, by the cooling machine 4. The excess of the cooling load produced by the cooling machine 4 and which is not necessary to the cooling of the internal temperature of the vehicle is stored in the frigories storage unit 8.

In the case where the step 103 determines that the vehicle M is in a tunnel, the state of load of the frigories storage unit 8 is measured in a step 105. If in the step 105 the state of load of the frigories storage unit 8 is of the order of 0, the cooling load is supported by the cooling machine 4, in a step 106. If the state of load is greater than 0, the cooling load is supported by the frigories storage unit 8, in a step 107.

The steps 101 to 107 are preferably triggered by the control device 11, by using the electronic communication links that are not represented.

By way of a variant that is not represented, the various operating configurations of the air handling system 1 may be triggered by separate control devices.

The invention claimed is:

1. An air handling system for a land transport vehicle, comprising:
   one or more air handlers distributed within the vehicle;
   a cooling circuit that supplies frigories to the one or more air handlers;
   a frigories storage configured to be loaded by the cooling circuit and configured to supply frigories to the one or more air handlers; and
   a controller configured to:
      determine whether the vehicle is travelling in an enclosed or partially enclosed space or in the open air,
      when the vehicle is travelling in the open air, determine an amount of frigories to be supplied by the cooling circuit to the one or more air handlers, and
      when the vehicle is travelling in an enclosed or partially enclosed space, determine an amount of frigories to be supplied by the frigories storage to the one or more air handlers, while the cooling circuit is not releasing any heat to the exterior of the vehicle,
   wherein if a surplus of frigories is produced by the cooling circuit, the cooling circuit is configured to load the frigories storage, and
   wherein the cooling circuit is configured to supply the frigories by discharging heat extracted from the interior of the vehicle into the exterior of the vehicle.

2. An air handling system according to claim 1, wherein the controller is configured to trigger the production of frigories by the cooling circuit if the frigories storage has a zero load.

3. An air handling system according to claim 1, wherein the controller is configured to
   measure the temperature on the exterior of the vehicle,
   measure the temperature of the air present within the interior of the vehicle in spaces reserved for persons,
   calculate a desired temperate within the interior of the vehicle based on the temperature on the exterior of the vehicle and the temperature of the air present within the interior of the vehicle, and
   determine the amount of frigories to be delivered by the cooling circuit or the frigories storage based on the desired temperature.

4. A land transport vehicle comprising an air handling system according to claim 1.

5. An air handling method for a land transport vehicle equipped with an air handling system including:
   one or more air handlers;
   a cooling circuit that supplies frigories to the one or more air handlers; and
   a frigories storage configured to be loaded by the cooling circuit and configured to supply frigories to the one or more air handlers when the vehicle is travelling in an enclosed or partially enclosed space;

the method comprising:
- determining, by a controller, whether the vehicle is travelling in an enclosed or partially enclosed space or in the open air,
- determining, by the controller, an amount of frigories to be supplied by the cooling circuit to the one or more air handlers, when the vehicle is travelling in the open air,
- determining, by the controller, an amount of frigories to be supplied by the frigories storage to the one or more air handlers, when the vehicle is travelling in an enclosed or partially enclosed space, while the cooling circuit is not releasing any heat to the exterior of the vehicle, and
- if a surplus of frigories is produced, loading the frigories storage by means of the cooling circuit when the vehicle is travelling in the open air, by discharging into the exterior of the vehicle heat extracted from an interior volume of the vehicle.

6. The air handling system of claim 1, wherein the air handling system is installed on a railway vehicle.

7. The air handling system of claim 1, wherein the cooling circuit is configured to supply the frigories to the one or more air handlers via a first circuit, and wherein the cooling circuit is configured to supply the frigories to the frigories storage via a second circuit.

* * * * *